G. C. CUMMINGS.
TELEGRAPH SYSTEM.
APPLICATION FILED APR. 22, 1918.

1,324,496.

Patented Dec. 9, 1919.

Inventor:
George C. Cummings.
by J. E. Roberts, Atty.

UNITED STATES PATENT OFFICE.

UNITED STATES PATENT OFFICE.

GEORGE C. CUMMINGS, OF EAST ORANGE, NEW JERSEY, ASSIGNOR TO WESTERN ELECTRIC COMPANY, INCORPORATED, OF NEW YORK, N. Y., A CORPORATION OF NEW YORK.

TELEGRAPH SYSTEM.

1,324,496.      Specification of Letters Patent.      Patented Dec. 9, 1919.

Application filed April 22, 1918. Serial No. 230,190.

*To all whom it may concern:*

Be it known that I, GEORGE C. CUMMINGS, a subject of the King of Great Britain, residing at East Orange, in the county of Essex, State of New Jersey, have invented certain new and useful Improvements in Telegraph Systems, of which the following is a full, clear, concise, and exact description.

This invention relates to telegraph systems and more particularly to telegraph receiving systems.

The principal object of this invention is to provide an improved organization of apparatus whereby economy of line time may be effected in connection with systems in which alternating currents are employed for the transmission of signaling impulses.

In accordance with the present invention there is provided a plurality of electroresponsive devices arranged to act inversely, one device with another, in the joint control of suitable devices whereby intervals of alternating current impulses in a line circuit may be translated in the form of a message.

This invention is illustrated diagrammatically in the accompanying drawing and, for the sake of clearness, only such portions of a telegraphic equipment have been shown as will be necessary to a clear understanding of the system.

Figure 1:
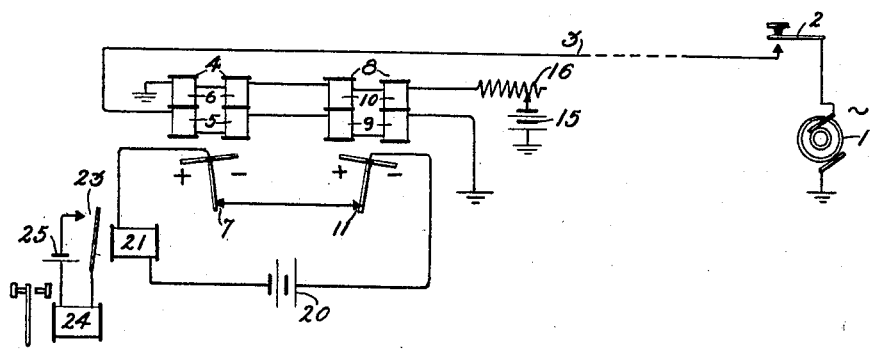
Figure 2:
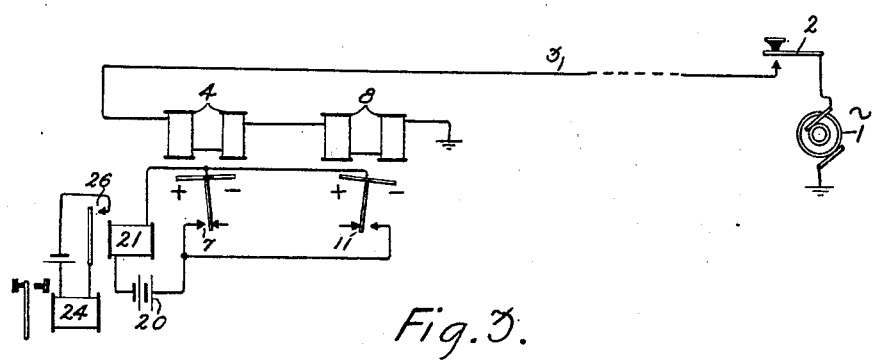
Figure 3:
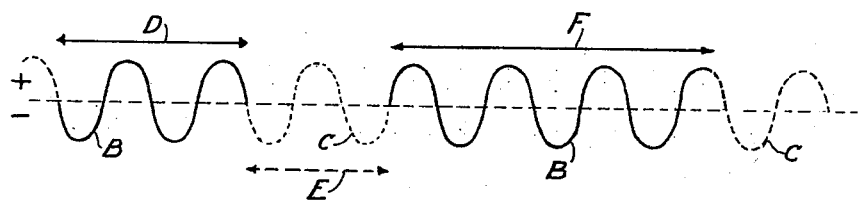

In the drawing, Figure 1 illustrates an arrangement of circuits and devices suitable for practising the features of this invention; Fig. 2 shows an alternate arrangement for accomplishing the service results characteristic of the arrangement shown in the first figure; while Fig. 3 is shown in theoretical form, a sine wave current divided into intervals corresponding with signaling impulses.

In describing this invention, the reference character 1 indicates an alternating current generator preferably of a type which may produce currents of sine wave form. This generator is connected from earth to a transmitter which, for convenience of description, is shown in the form of a manually operated key arranged to connect the generator 1 with a line conductor 3, thereby permitting alternating currents from the generator to traverse the line conductor, thence serially through the windings 5 of a first polar relay 4 and the windings 9 of a second polar relay 8 to earth. These relays will be understood to be polarized by means not shown and current from a battery 15 connected through an adjustable rheostat 16 and the local windings 10 and 6 of the relays 8 and 4, respectively, to earth may be employed for biasing the armatures of these relays. Biasing of the relay armatures may, of course, be effected by means of suitable retractile springs in situations where such an arrangement would be desirable. The time constant of operation of the relays 4 and 8 is of such relation to the frequency of the generator 1 that the armatures of these relays may, under the influence of the alternating current, move in phase with the alternations. As indicated by the conventional plus and minus signs adjacent the relay armatures, it will be understood that an impulse of positive current from the line 3 will bias both armatures to the left, thereby separating the contacts 7 of the relay 4, while the contacts 11 of the relay 8 will be closed and, in a reciprocal manner, an impulse of negative current from the line 3 will bias the armature of the relay 4 to close its contacts 7, while the armature of the relay 8 will be biased to separate its contacts 11. A battery 20 is connected serially through a local relay 21 and the contacts 7 and 11 of the two polar relays, while contacts 23 of the relay 21 control a local circuit which includes a device 24 as a reading sounder or other suitable telegraphic receiving means.

From this description of the system it will be clear that during the time the contacts of the key 2 are separated, no current being present in the line 3, the contacts of the relays 4 and 8 will maintain the local relay 21 energized, and it will be further obvious that during the time the contacts of the transmitting key 2 may be closed, alternating currents from the generator 1 will cause the armatures of the polar relays to be rocked in such a manner that at any given instant either the contacts 7 or the contacts 11 will be opened; therefore, no current may flow through the relay 21 during such application of alternating current to the line 3. Cessation of current through the local relay 21 permits its local contacts 23 to establish the associated battery 25 to operate the receiving device 24.

Assuming that the Morse code may be employed in transmitting messages by means of the key 2, it will be readily apparent that for any frequency of the generator 1, which may be sufficiently low to permit the polarized relays 4 and 8 to follow as relates to their operation, the key may be closed or opened at any point on a cycle or wave of the alternating current. Assuming for the purpose of illustration that for a given sending speed a "dot" would correspond in time with two complete waves of the alternating current and that a dash would correspond with, say, three and one-third alternating current waves. This time relation for dots and dashes is illustrated in Fig. 3 of the drawing in which "A" indicates the zero or no-current moment line, while the shaded, curved line "B" indicates the alternating current waves, and the dotted curved line "C" indicates cessation of the alternating current.

It will, therefore, be clear that the interval "D" may correspond with a dot, while the interval "E" corresponds with a space and the interval "F" corresponds with a dash. Assuming now for purpose of illustration, that the key 2 may be closed at the beginning of the current period corresponding with the beginning of the dot D, and that the key will be opened at the point indicating cessation of current, the no-current interval may continue until the key is again closed in time with the beginning of the dash current interval F, which may cease as indicated by the dotted curved line following this period. Since the half-waves above the line A represent positive impulses, while the half-waves below the zero line represent negative impulses, as indicated in the drawing, it will be clear that, for the transmission of the dot D the key 2 was closed at the moment of no-current from the generator 1 and as the next wave first builds up in the negative direction, so soon as the current value of this first half-wave attains a strength sufficient to operate the receiving polar relay 8, the armature of this relay will respond to separate its contacts 11, thereby releasing the local relay 21, following which the next half-wave of positive sign will bias the relay 4 to separate the contacts 7 to disable the circuit of the relay 21 at that point, during the instant the positive half-wave will have established the contacts 11 of the relay 8. As assumed, the key 2 disconnects the generator at an instant of no-current, at which time the contacts 7 and 11 of the polar relays may, in phase with the time constant of these relays, restore and establish the contacts 7 and 11 to energize the local relay 21. For the space interval the key 2 may continue open during a period equal to one and one-half waves of the alternating current and at the instant the key is closed to form the dash F, a wave will be starting on its positive side; therefore, on the instant this wave reaches a value sufficiently high, the relay 4 will be operated to separate its contacts 7 and thereby disconnect the relay 21.

From this description of the relation of the key with respect to the alternating current waves, it will be obvious that irrespective of the polarity of a half wave at the instant the current may be applied to the line, one or the other of the relays 4 or 8 will respond and prevent loss of line time which would otherwise occur in case only one polar relay were present at the receiving station. To make this point clear, let it be assumed that the relay 8 is dispensed with and the contacts 7 of the relay 4 connected directly to the right-hand side of the local battery 20. If now the key 2 were closed to form the dot D, it would necessarily follow that no action could take place at the receiving station during the rise and fall of the negative half-wave, following which it would be necessary for the first positive half-wave of this interval to attain a value sufficiently high to operate the relay 4, at which instant the contacts 7 would separate to disconnect the relay 21. For the dash interval F the single relay 4 would, of course, open the circuit of the relay 21 on the instant the first half-wave of this interval which is of positive polarity attains a strength sufficient to operate the relay 4. From this assumed example it will be obvious that there would necessarily be a discrepancy between the time intervals of the transmitting key 2 and the corresponding intervals as marked by the receiving equipment.

As illustrated by the single receiving relay example assumed, for the dot D, it would be necessary for the key to be held closed an additional length of time corresponding with the entire first half-wave of negative current and such portion of the next positive impulse as would be required for this half-wave to build up before the single polar relay may respond. This waiting time would, of course, encroach and extend into the space intervals E and in turn into the dash interval F. Since the sending speed of different operators varies to a large extent it will be clear that for any given speed a considerable time would be lost and such time might be lost during either spacing or current intervals, thereby materially reducing the speed of transmission and lowering the message capacity of the line.

Referring to Fig. 2 of the drawing, the arrangement shown therein differs from the arrangement shown in Fig. 1 in that the contacts 7 of the relay 4 are connected in parallel with the contacts 11 of the relay 8, the polarity relation of these relays as indicated by the plus and minus signs in the drawing being such that the normal bias of the armatures retains the respective contacts open, while an impulse of positive current will cause the contacts 7 of the relay 4 to be closed, and the contacts 11 of the relay 8 to be separated and vice versa for a negative impulse. In this manner, so long as the key 2 may apply alternating currents to line conductor 3, either the contact 7 or 11 will be closed to connect the battery 20 through the relay 21. For this arrangement the local circuits of the receiving device 24 may be completed over the forward contacts 26 of the relay 21 as shown in order that reading of the telegraphic signals at the device 24 will be corrected and correspond with the reading of the signals at the key 2. From the description already given in connection with Fig. 1 of the drawing, it will be clear that the same advantages relative to a saving of line time will be present with the alternate arrangement shown in Fig. 2.

It will be understood that in the second figure of the drawing, the relays 4 and 8 may be provided with polarizing circuits similar to the circuits shown for the corresponding relays in the first figure of the drawing and that normal biasing of the armatures of the relays may be effected in the same way as already described. It will, of course, be understood that instead of the biasing circuit for the relays shown in each arrangement permanent magnets or an asymmetrical adjustment of the magnetic gap-spaces of the relay may be substituted therefor.

Although the arrangement illustrated is considered to be a preferred embodiment of this invention, it will be understood that changes in the organization of the apparatus may be made without departing from the spirit of this invention, and although, for convenience of description, the system has been more particularly considered in connection with Morse working it will nevertheless be understood that instead of the key 2, an automatically controlled transmitter may be employed for sending impulses of uniform duration, as the impulse code of Baudot, the receiving relays being arranged to control a suitable recorder or printing telegraph receiver.

What is claimed is:

1. In a telegraph system wherein signaling is effected by the transmission of alternating current impulses to a line conductor, a receiving system comprising two relays connected in circuit with said line conductor and oppositely polarized to respond to positive and negative currents respectively, a local circuit under the joint control of said relays, and a responsive device in said local circuit arranged to respond when either of said relays is energized.

2. In a telegraph system, a line circuit, a first and a second electroresponsive device serially included in said line circuit, means for impressing alternating currents on said line to effect signaling, a local circuit, and means alternately controlled by said first and second electroresponsive devices for disabling said local circuit in the reception of said signals.

3. In a telegraph system, a line conductor, a pair of relays included in said line conductor, means for impressing impulses of alternating currents on said line, a third relay, means for rendering said first and second relays effective to normally energize said third relay, and a receiving means controlled by said third relay for the translation of signaling impulses effective with said first and second relays.

In witness whereof I hereunto subscribe my name this 12th day of April, A. D., 1918.

GEORGE C. CUMMINGS.